United States Patent
Wang et al.

(10) Patent No.: US 10,809,708 B2
(45) Date of Patent: Oct. 20, 2020

(54) GENERATING EVENTS USING CONTEXTUAL INFORMATION ON AN INTELLIGENT PROGRAMMABLE LOGIC CONTROLLER

(71) Applicant: Siemens Aktiengesellschaft, Munich (DE)

(72) Inventors: Lingyun Wang, Princeton, NJ (US); Steffen Lamparter, Feldkirchen (DE); Juan L. Aparicio Ojea, Berkeley, CA (US)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 15/740,016

(22) PCT Filed: Jul. 9, 2015

(86) PCT No.: PCT/US2015/039670
§ 371 (c)(1),
(2) Date: Dec. 27, 2017

(87) PCT Pub. No.: WO2017/007479
PCT Pub. Date: Jan. 12, 2017

(65) Prior Publication Data
US 2018/0181112 A1 Jun. 28, 2018

(51) Int. Cl.
*G05B 19/00* (2006.01)
*G05B 23/02* (2006.01)
(Continued)

(52) U.S. Cl.
CPC ....... *G05B 23/0264* (2013.01); *G05B 19/058* (2013.01); *G05B 23/027* (2013.01);
(Continued)

(58) Field of Classification Search
CPC .................. G05B 23/0264; G05B 23/027; G05B 19/058; G05B 23/0243; G06F 11/362; G06F 2201/86
See application file for complete search history.

(56) References Cited

U.S. PATENT DOCUMENTS

| | | |
|---|---|---|
| 2003/0023336 A1 | 1/2003 | Kreidler et al. |
| 2008/0125887 A1 | 5/2008 | Case |

(Continued)

FOREIGN PATENT DOCUMENTS

| | | |
|---|---|---|
| CN | 1782934 A | 6/2006 |
| CN | 201469714 U | 5/2010 |

(Continued)

OTHER PUBLICATIONS

International Search Report dated Mar. 21, 2016; Application No. PCT/US2015/039670; Filing Date: Jun. 24, 2015; 15 pages.

(Continued)

*Primary Examiner* — Michael D Masinick

(57) ABSTRACT

A method of generating events based on automation system data in an intelligent programmable logic controller includes the intelligent programmable logic controller collecting automation system data and applying a context model to the automation system data to create contextualized data. The intelligent programmable logic controller generates one or more events based on the contextualized data.

10 Claims, 12 Drawing Sheets

(51) Int. Cl.
  *G06F 11/36* (2006.01)
  *G05B 19/05* (2006.01)

(52) U.S. Cl.
  CPC ........ *G05B 23/0243* (2013.01); *G06F 11/362* (2013.01); *G06F 2201/86* (2013.01)

(56) References Cited

U.S. PATENT DOCUMENTS

| | | | | |
|---|---|---|---|---|
| 2009/0292677 | A1* | 11/2009 | Kim | G06F 16/958 |
| 2009/0327172 | A1* | 12/2009 | Liu | G06N 20/00 |
| | | | | 706/12 |
| 2013/0211546 | A1* | 8/2013 | Lawson | G05B 19/4185 |
| | | | | 700/9 |
| 2015/0149455 | A1* | 5/2015 | Whitley, Jr. | G06F 16/24553 |
| | | | | 707/734 |
| 2016/0306836 | A1* | 10/2016 | Mortazavi | G06F 16/2272 |
| 2018/0005146 | A1* | 1/2018 | Chintalapaty | G06Q 10/063 |
| 2018/0181112 | A1* | 6/2018 | Wang | G05B 23/0264 |

FOREIGN PATENT DOCUMENTS

| | | |
|---|---|---|
| CN | 101872184 A | 10/2010 |
| JP | 2001296911 A1 | 10/2001 |
| RU | 2525369 C2 | 8/2014 |

OTHER PUBLICATIONS

Snort Team: "SNORT Users Manual 2.9.7", Oct. 13, 2014 (Oct. 13, 2014), pp. 1-265, XP055207231, Retrieved from the Internet: URL:https://s3.amazonaws.com/snort-org-sit e/production/document files/files/OOO/OOO/ 051/original/snort_manual.pdf?AWSAccessKey Id=AKIAIXACIED2SPMSC7GA&Expires=1439298212&Signature=LOGf2R+mg2nKG8/6CK6orNBfrG4= [retrieved on Aug. 11, 2015] Section 2.9; p. 173 Sections 3.1 and 3.2.1; p. 181-p. 182 / Oct. 13, 2014.
RU Search Report; Application No. 2017146051; Filing Date: July 9, 2015; 2 pages.
Chinese Report of Exam dated Oct. 23, 2019; Chinese Patent Application No. 2015800815560; 19 pages.

* cited by examiner

| Table View Online | | | | | | | |
|---|---|---|---|---|---|---|---|
| identifier | occursAt... | occursDu... | occursOn... | type | startTime | causedBy | endTime |
| Event4 | Positioni... | QualityC... | Door3 | DoorQua... | 2:01:57 PM | Event3 | 12/31/19... |
| Event5 | Positioni... | DoorMo... | Door6 | Positioni... | 2:03:23 PM | Event0 | 12/31/19... |
| Event6 | Positioni... | QualityC... | Door6 | DoorQua... | 2:03:27 PM | Event5 | 12/31/19... |
| Event7 | Positioni... | DoorMo... | Door9 | Positioni... | 2:04:53 PM | Event0 | 12/31/19... |
| Event8 | Positioni... | QualityC... | Door9 | DoorQua... | 2:04:57 PM | Event7 | 12/31/19... |
| Event9 | DoorQua... | DoorMo... | Door16 | Positioni... | 2:07:54 PM | Event0 | 12/31/19... |
| Event10 | Positioni... | QualityC... | Door16 | DoorQua... | 2:07:58 PM | Event9 | 12/31/19... |
| Event11 | DoorQua... | DoorMo... | Door18 | Positioni... | 2:08:54 PM | Event0 | 12/31/19... |
| Event12 | Positioni... | QualityC... | Door18 | DoorQua... | 2:08:58 PM | Event11 | 12/31/19... |

FIG. 3

| Rules | |
|---|---|
| Search | Name* |
| | Door Quality Problem |
| Door Quality Problem | Description |
| Door Quality Problem with causedBy | Rule to find door quality problems |
| Positioning Control Abnormality | |
| | Code |
| | (defrule rule_quality_event "Door Quality Problem"<br>  (DoorQualitySensor ?val)<br>  (test (> ?val 0))        ; DoorQuality threshold<br>  (DoorIdSensor ?door_id)<br>  (unique_id ?event_id)      ; Unique event ID<br>  (not (exists (event ?x 1 ?door_id)))  ; No other quality event exists for this ?door_id<br>  (not (exists (event ?y 0 ?door_id)))  ; No other positioning event exists for this ?door_id<br>  =><br>  (userEvent ?event_id 1 ?do[ Clear Fields ] [ Save ] [ Delete ]<br>  (assert (event ?event_id 1 ?<br>  (assert (unique_id (+ ?event_id 1))) ; Increment unique ID |

FIG. 7A

| Rules | |
|---|---|
| Search | Name* |
| | Positioning Control Abnormality |
| Door Quality Problem | Description |
| Door Quality Problem with causedBy | Rule to find positioning control adbnormalities |
| Positioning Control Abnormality | |
| | Code |

```
(defrule rule_position_event "Positioning Control Abnormality"
   (PositioningLoopCountSensor ?val)
   (test (> ?val 5))              ; LoopCount threshold
   (DoorIdSensor ?door_id)        ; DoorIdSensor
   (unique_id ?event_id)          ; Unique event ID
   (not (exists (event ?x 0 ?door_id)))   ; No other positioning event exists for this ?door_id
   =>
   (userEvent ?event_id 0 ?door_id 1 0 0)    ; Call userEvent()
   (assert (event ?event_id 0 ?d
   (assert (unique_id (+ ?event
)
```

[ Clear Fields ]  [ Save ]  [ Delete ]

FIG. 7B

| Rules | |
|---|---|
| Search | Name* |
| | Door Quality Problem with causedBy |
| Door Quality Problem | Description |
| Door Quality Problem with causedBy | Rule to find door quality problems with causedBy |
| Positioning Control Abnormality | |
| | Code |
| | (defrule rule_quality_event_causedBy "Door Quality Problem with causedBy"<br>  (DoorQualitySensor ?val)<br>  (test (> ?val 0))       ; DoorQuality threshold<br>  (DoorIdSensor ?door_id)<br>  (unique_id ?event_id)      ; Unique event ID<br>  (not (exists (event ?x 1 ?door_id)))   ; No other quality event exists for this ?door_id<br>  (event ?cause_id 0 ?door_id)   ; Positioning event exists for this ?door_id<br>  =><br>  (userEvent ?event_id 1 ?doo[...]<br>  (assert (event ?event_id 1 ?[...]<br>  (assert (unique_id (+ ?event_id 1)))  ; Increment unique ID |

[ Clear Fields ]  [ Save ]  [ Delete ]

FIG. 7C

GENERATING EVENTS USING CONTEXTUAL INFORMATION ON AN INTELLIGENT PROGRAMMABLE LOGIC CONTROLLER

TECHNICAL FIELD

The present invention relates generally to the use of a programmable logic controller which generates events using contextual information from an automation environment. The disclosed technology may be applied to, for example, various production systems where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control automation systems. Automation systems typically generate a large amount of data in their daily operations. This data may include, for example, sensor data, actuator and control program parameters, and information associated with service activities. During their operation PLCs may generate one or more events such as, for example, alarms or system states. These events hold important information about the automation process because they offer a view of the state of the system.

Conventional PLCs are very limited in terms of the types of events that may be generated. Major events are statically configured and programmed during the engineering phase. However, many important events to the control process (e.g. soft-sensors or hidden control variables exceeding threshold values) are not automatically captured, detected, or even raised. It is also very difficult to add or change events during the runtime. Thus, during the diagnostic phase, it is very hard for engineers to change the monitoring variables and rules to trace, debug, and diagnose an error. Typically, the production process must be stopped which, in turn, results in high maintenance costs.

Moreover, the useful information provided by events in conventional PLCs is minimal. For example, one important type of event used in conventional systems is an alarm. Alarms are used to alert for errors in the production process. Once an alarm is raised, engineers will first look into the content (e.g., texts or properties) of the event and try to associate it with other simultaneous events. However, the only information provided by an alarm is through its text based description (e.g., quality error) and limited properties (e.g., severity). A true understanding of the system (e.g., as developed through root-cause analysis and other data analytic processes), require additional information about the alarm conditions. For example, how the alarm is raised? Does the alarm belong to a production process or a product? Is the alarm associated to some real-time sensor data, or historic data? Are there any other events that may be relevant to (e.g. cause) this alarm? This type of information is not available in conventional systems because events are isolated and not linked to the historic data and contexts. Instead, foresight and preparation is needed in order to make sense of a raised event.

Cascades of events are also not well handled by conventional systems. Today, in designing automation systems, a great deal of care must be taken when a cascade of alarm events occurs in a short time, otherwise the underlying cause (which might not be the earliest event detected) may get lost in the noise. The context knowledge that links the cascade of events is not managed and utilized.

SUMMARY

Embodiments of the present invention address and overcome one or more of the above shortcomings and drawbacks, by providing methods, systems, and apparatuses related to an Intelligent PLC which generates enhanced events utilizing contextual knowledge about the automation environment. The enhanced events may be used, for example, to perform in-field analytics.

According to some embodiments of the present invention, a method of generating events based on automation system data in an Intelligent PLC includes the Intelligent PLC collecting automation system data and applying a context model to the automation system data to create contextualized data. The Intelligent PLC generates one or more events based on the contextualized data. In some embodiments, the Intelligent PLC also retrieves historical automation system data from a non-volatile computer-readable storage medium operably coupled to the Intelligent PLC. This historical data may also be used for event generation.

In some embodiments of the aforementioned method, the Intelligent PLC stores the one or more events in an event database included within the Intelligent PLC. The method may then further include the Intelligent PLC receiving an event request, formulating a query based on the event request and the context model, and retrieving response data from the event database based on the query.

In some embodiments of the aforementioned method, the Intelligent PLC performs an in-cycle event generation process during each control cycle. This in-cycle event generation process may include, for example, collecting automation system data, using analytics components to determine whether an event generation condition exists based on the automation system data, and generating one or more additional events if the event generation condition exists. In some embodiments, the analytics components may be updated based on one or more new analytics specifications during runtime of the Intelligent PLC. These analytics specifications may include, without limitation, rule specifications, workflows of analytical operations, Predictive Model Markup Language (PMML) specifications, complex queries, etc. In some embodiments, the Intelligent PLC retrieves historical automation system data from a non-volatile computer-readable storage medium operably coupled to the Intelligent PLC. The Intelligent PLC then modifies one or more analytics specifications used by the analytics components based on the historical automation system data.

According to another aspect of the present invention, as described in some embodiments, a second method of generating events based on automation system data includes an Intelligent PLC performing an in-cycle event generation process over a plurality of control cycles. This in-cycle event generation process may include, for example, collecting automation system data, using analytics components to determine whether an event generation condition exists based on the automation system data, and generating one or more events if the event generation condition exists.

Various additional features, enhancements, or modifications may be made to the aforementioned second method. For example, in some embodiments, the method further includes updating the analytics components based on new analytics specifications during runtime of the Intelligent PLC. In some embodiments, the Intelligent PLC retrieves locally stored historical automation system data and uses that data to modify rules specifications used by the analytics components.

In other embodiments of the aforementioned second method, the Intelligent PLC applies a context model to the automation system data and generates one or more additional events based on the contextualized data. In some embodiments, locally stored historical automation system data may be retrieved and used to generate these additional events. In some embodiments of the method, events are stored in a local database on the Intelligent PLC. When an event request is received, the intelligent programmable logic computer formulates a query based on the event request and the context model. In turn, this query may be used to retrieve response data from the event database.

According to other embodiments of the present invention, an Intelligent PLC includes a processor configured to execute according to a control cycle, a volatile computer-readable storage medium comprising a process image area, a non-volatile computer-readable storage medium, and controller components executed by the processor according to the control cycle. These controller components include a data transfer component configured to update the process image area during each control cycle with contents comprising automation system data. The controller components also include a contextualization component configured to apply a context model to the automation system data to create contextualized data, and generate one or more events based on the contextualized data. In some embodiments, these events are based on historical automation system data. Additionally, the controller components include a historian component comprising an event database configured to store the one or more events on the non-volatile computer-readable storage medium.

In some embodiments, the contextualization component used in the aforementioned Intelligent PLC includes additional functionality. For example, in one embodiment, the contextualization component is further configured to perform an in-cycle event generation process during each control cycle. This in-cycle event generation process may include, for example, using analytics components to determine whether an event generation condition exists based on the automation system data, and generating one or more additional events if the event generation condition exists. In some embodiments, the analytics components are updated based on new analytics specifications during runtime. In other embodiments, the contextualization component is further configured to retrieve historical automation system data from the historian component and modify one or more previously received analytics specifications used by the analytics components based on the historical automation system data. In still other embodiments, the contextualization component is further configured to use the context model to formulate queries based on received event requests in order to retrieve response data from the event database.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 3 provides a view of an example event database for door assembly control process;

FIG. 7A shows a rule to generate a door quality problem event;

FIG. 7B shows a rule to generate a positioning control abnormality event;

FIG. 7C shows a rule that links the door quality event and the position control abnormality event.

DETAILED DESCRIPTION

Figure 1:
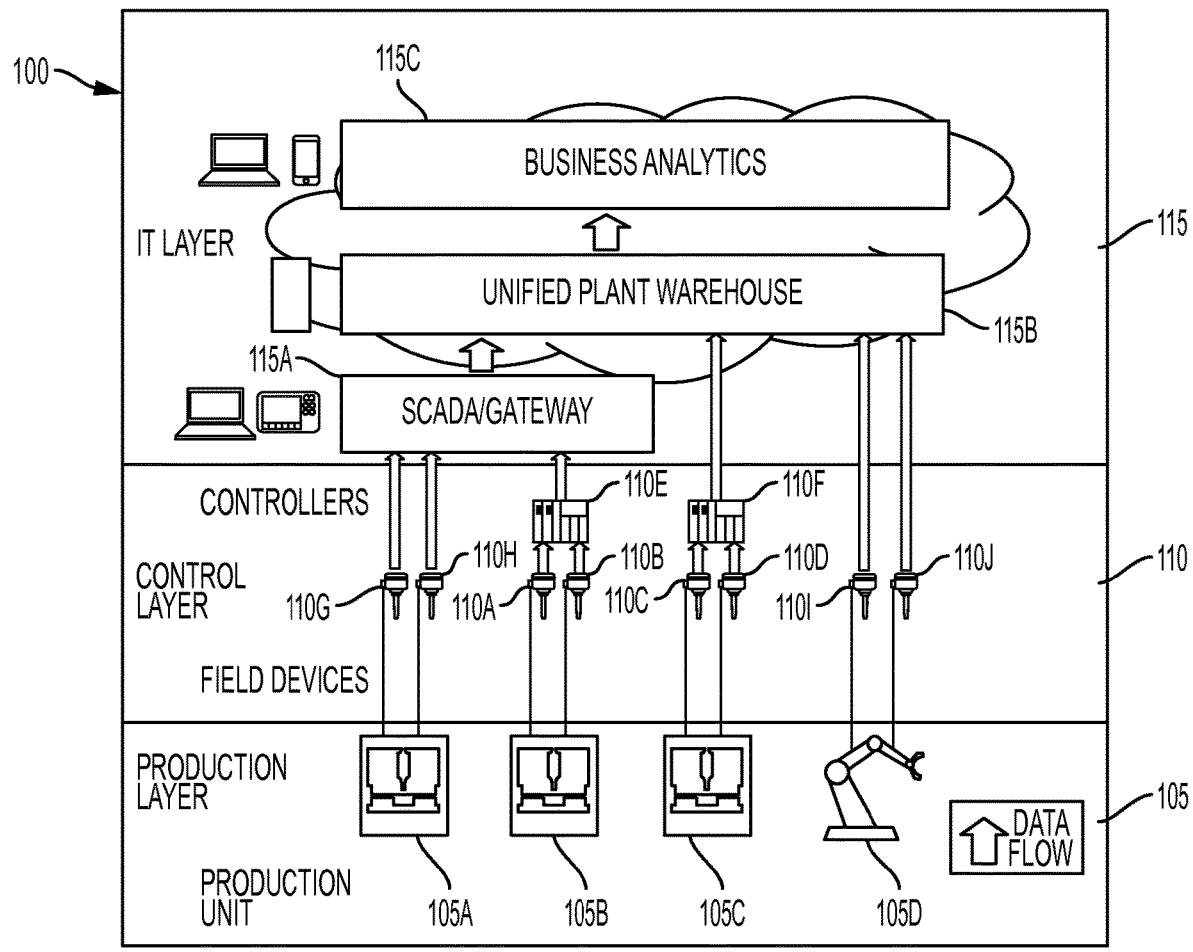
FIG. 1 provides a system view of an Intelligent PLCs integrated into an automation system, according to some embodiments of the present invention.

Systems, methods, and apparatuses are described herein which relate generally to a PLC which an Intelligent PLC which generates enhanced events utilizing contextual knowledge about the automation environment. More specifically, the technology described herein allows the usage of data (e.g., process image and historian of input, output, soft-sensor data, etc.) and context knowledge (e.g., control knowledge, plant model, etc.) within the PLC in order to trigger events available at control level. These events, referred to herein as "enhanced events" may be based on fixed properties, as well as dynamic monitoring logic (e.g., rules) which may use information learned from historic data. In conventional automation systems, events are usually restricted to alarms. However, there are many other important situations within a control process that should be documented and historized explicitly. For example, the fact that a product has been successfully processed by machine and passed on to the next process step is important information. An enhanced event can be used to capture this and to attach further important information, such as energy consumed by the machine for this product, quality of the product, parameters of the production process such as machine configuration, etc. For subsequent data analytics like KPI calculation on SCADA/MES level, such events simplify data collection and preparation.

Various embodiments of the present invention are described in the context of a PLC which includes various components configured to provide an assortment of enhanced functions in control applications. This PLC, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and uses different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, no events are lost. Efficient compression algorithms (e.g., a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sampling rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

As described in the various embodiments disclosed herein, the Intelligent PLC may be configured to generate enhanced events. An enhanced event in the Intelligent PLC comprises an identifier, a start and end time, and some description. In addition, the following context information may include one or more of the following fields: occursAtAsset (the asset that the event occurs at); occursDuringProcess (the current automation process); occursOnProduct (the product to be produced); type (types of the event, a position error or a calibration error); and cause-by (what other event that triggers this event). The properties of an event are not limited by the above list. In the Intelligent PLC, the event properties can be dynamically added based on the analytics specifications (e.g. rule specifications, workflows of analytical operations, Predictive Model Markup Language (PMML) specifications, complex queries, etc.), which can be changed dynamically during runtime.

FIG. 1 provides a system view of an Intelligent PLCs integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 110 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Moreover, enhanced events can be generated based on this data at the Control Layer 110 and passed up to the IT Layer 115. Additionally, in some embodiments, the Intelligent PLCs 110E and 110F may generate events using data analytics functionality implemented directly on their respective device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field devices known in the art may be used with the Intelligent PLC described herein. Example field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 1, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). This allows insights to be made from data analytics with higher confidence and quality. In turn, the Intelligent PLCs 110E and 110F have a more diverse set of knowledge for generating enhanced events. In some embodiments, the system 100 uses semantic data representation languages and standards for contextualization of data in automation systems. This allows business analytics as well as SCADA-level historians (e.g. OSI PI asset framework) to be configured with minimal effort for integration with data from other systems/devices/sources. Also the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

In addition to the typical sensor inputs and control outputs transferred to the IT Layer 115 or the Production Layer 105, the Intelligent PLCs 110E and 110F may store, utilize, and historize local control-layer parameters and variables, which in conventional automation systems are hidden inside the Control Layer 110 (i.e., soft-sensors).

Enhanced events may be used by the Intelligent PLCs 110E and 110F for in-field analytics at the Control Layer 110 to leverage the control knowledge and other context information. For example, the root-cause of a door assembly quality problem can be identified as a skid barcode sensor reading error by analyzing a series of relevant events. The enhanced events build the links of the asset (e.g. a sensor), time-based data (e.g., abnormal high value of a control variable), and the final quality error. With the context as part of the event properties, enhanced events can help understand: downtime and overall equipment effectiveness (OEE), excursions, startups, shutdowns, etc. For example, questions related with DOWNTIME that the event database can help answer: how often a particular asset is down, what are the causes of downtime, and which of these causes should be addressed first?

Figure 2:
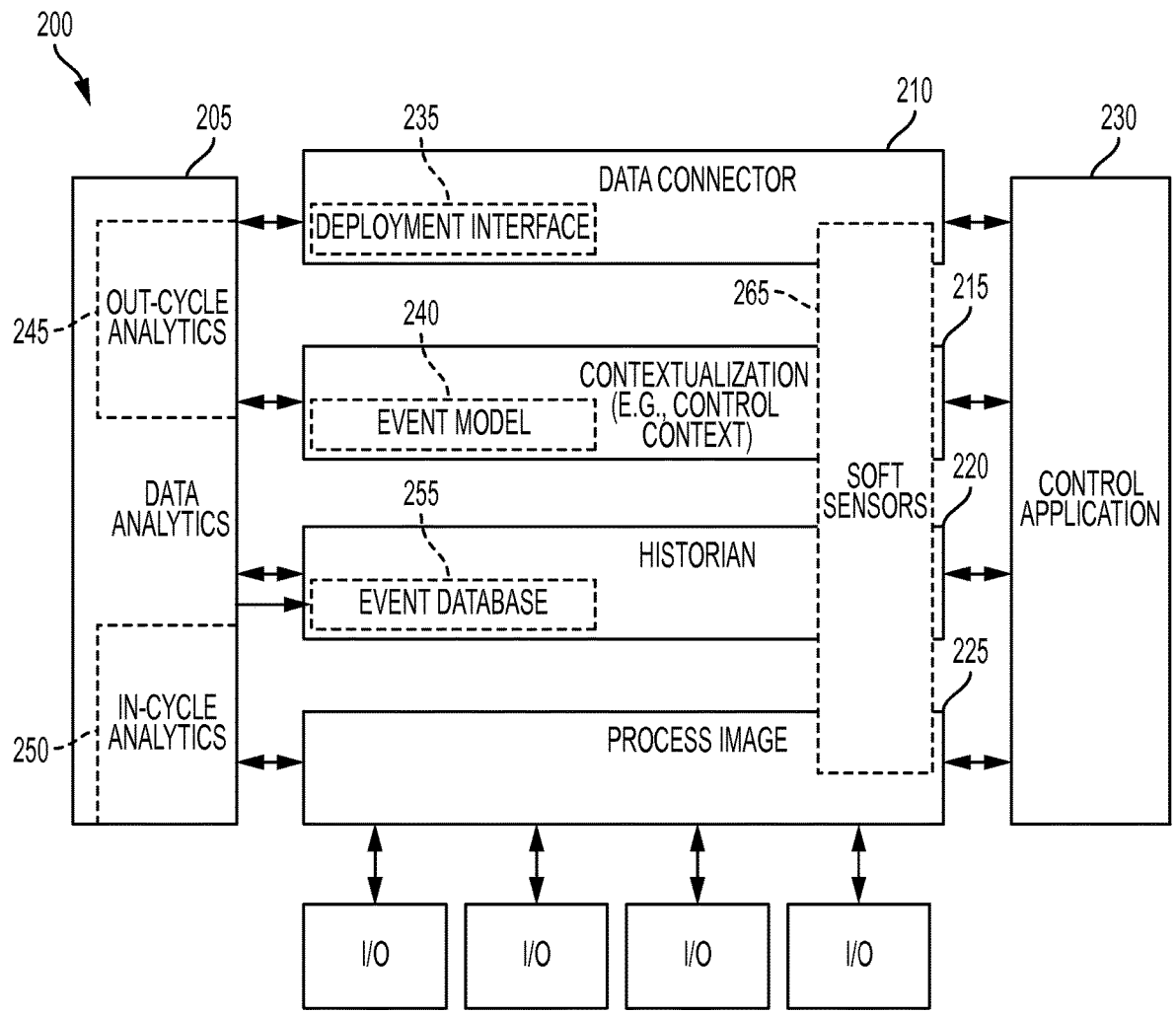
FIG. 2 provides an illustration of the system components included in an Intelligent PLC which may be used to generate enhanced events, according to some embodiments of the present invention.

FIG. 2 provides an illustration of the system components included in an Intelligent PLC 200 which may be used to generate enhanced events, according to some embodiments of the present invention. Process Image Component 225 is a memory area in a controller's CPU volatile system memory which is updated in each processing/scan cycle based on data associated with the production devices (e.g., the inputs and outputs of connected I/Os). In each processing step, the Control Application 230 reads the Process Image Component 225, executes deployed application logic, and writes results back into the Process Image Component 225. The Process Image Component 225 may include various system events and alarms that are used in conventional automation systems. These system events and alarms are manually programmed during the engineering phase and cannot be modified without decommissioning the automation project.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or online algorithms are used to realize dynamic caching heuristics. As part of the Historian Component 220, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient.

The Data Analytics Component 205 comprises a set of data analysis algorithms that process the current or past process images (queried from the historian). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

The Data Analytics Component 205 includes an In-Cycle Analytics Module 250 and an Out-Cycle Analytics Module 245 which generate enhanced events. Each enhanced event is characterized by a start time, an end time and a list of attributes, including pointers to the actual data. The In-Cycle Analytics Module 250 evaluates data (e.g., from the Process Image Component 225 or the Historian Component 220) at high frequency at every control cycle. If certain conditions are satisfied, an enhanced event will be generated. For example, in some embodiments, the In-Cycle Analytics Module 250 may contain an embedded rule engine that evaluates input sensor data at every control cycle against some specifications (e.g. rules). The rule engine may fire events if the conditions of the rules are satisfied. The Out-Cycle Analytics Module 245 operates in a manner similar to the In-Cycle Analytics Module 250. However, because analytics computations are performed outside the normal processing cycle by the Out-Cycle Analytics Module 245, the Out-Cycle Analytics Module 245 may generate enhanced events using analytics computations which take longer than one control cycle.

Once enhanced events are generated from the Data Analytics Component 205, they are stored in an Event Database 255 in the Historian Component 220. Just like the historian data, once the enhanced events are stored, they can be queried by external components (e.g. IT layer) through the Data Connector Component 210 or by the Data Analytics Component 205 for further analytics (e.g. for performing root-cause analysis). In some embodiments, an event frame may be used to historize any enhanced event as defined by a set of rules applied over the Historian Component 220 and Process Image Component 225 values.

In contrast to time-series data, enhanced events are less frequent, contain several fields (e.g., name, time, linked events, etc.) and do not necessarily need to be compressed. Thus, in some embodiments, a relational database may be used as the Event Database 255. Relational database management systems allow a structured and efficient data access according to the different fields of the events and therefore enable efficient access to specific events. FIG. 3 provides a view of an example event database for door assembly control process. All the events are stored along with the historian data in the storage media (e.g. a SD card) of the Intelligent PLC. Notice each event entry contains the context knowledge in its properties such as occursAtAsset, occursDuringProcess, and causedBy attributes.

The Intelligent PLC 200 also includes a group of Soft-Sensors 265. Each soft sensor provides access to a control layer variable that would ordinarily not be accessible outside of the Intelligent PLC 200. Thus, by dynamically activating a particular soft-sensor, the data may be made available, for example, via the Data Connector Component 210. Additional information on soft-sensors may be found in International Application No. PCT/US14/63105 entitled "Using Soft-Sensors in a Programmable Logic Controller," the entirety of which is incorporated herein by reference.

A Contextualization Component 215 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 215 may not be restricted to the asset structure but may also include control knowledge, product-specific information, process information, event information, and potentially other aspects such external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Event Model 240 is included in the Contextualization Component 215. The Event Model 240 is linked with other contexts such as Asset and Control context (see FIG. 5). The context is provided to the Data Analytics Component 205 to generate events. For example, a position error event can be associated to a control variable (soft-sensor/control variable in the control context) and a skid barcode sensor (a sensor in asset model). The position error event is generated at runtime with such context information.

Using the functionality of the Data Analytics Component 205 and the Contextualization Component 215 described herein, the scope of analysis and optimization may be expanded to cover the production processes themselves and is not limited to the Intelligent PLC itself or the area of the directly controlled devices. For example, the focus of analytics on the Intelligent PLC may not only be to ensure the functioning of the Intelligent PLC and its connected sensors and actuators (e.g., hardware-specific enhanced events) but also to optimize the controlled production process in a larger context (e.g., based on knowledge of the application domain and infrastructure).

Any data captured or generated by the components of Intelligent PLC 200 (including enhanced events) may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer.

Figure 4:
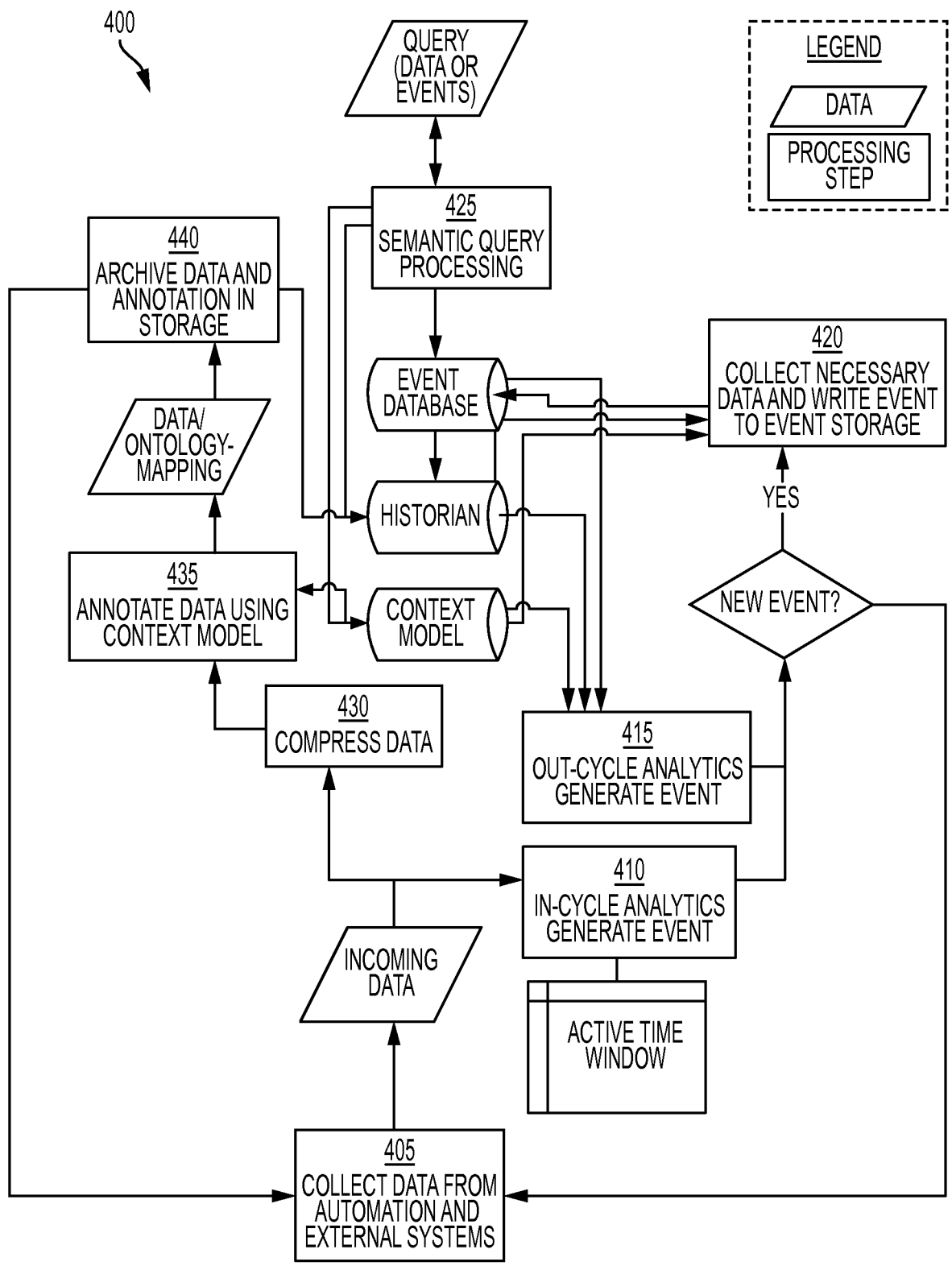
FIG. 4 provides a process in which enhanced events are generated, stored, and utilized by an Intelligent PLC, according to some embodiments of the present invention.

FIG. 4 provides a process 400 in which enhanced events are generated, stored, and utilized by an Intelligent PLC, according to some embodiments of the present invention. Starting at step 405, incoming data is collected from automation devices (e.g., sensors) and other external systems. This data may include, for example, time series data, control events, alarms and other structured (e.g., relational data) and unstructured data (e.g., messages, texts). Next, at step 410, the data is used to update an in-cycle analytics component in the Intelligent PLC (see FIG. 2) which continuously monitors and analyzes the data in its active window in order to generate new events. In some embodiments, the generation of events is done by a specification, for example, using defined rules or patterns.

In addition to the in-cycle analytics performed at step 410, the data is stored in a historian component on the Intelligent PLC. The storage process begins at step 430 where the data is compressed, for example, using one or more compression techniques generally known in the art. Next, at step 435, the compressed data is annotated with and processed according to relevant context models available as ontologies in a standard ontology language (e.g., RDF, OWL as standardized by W3C). In some embodiments, the processing performed at 435 is done by explicitly generating semantic data as instances of the ontology. In some embodiments, this is done by using RDF triples. As is well understood in the art, the underlying structure of an expression in RDF is a collection of triples comprising a subject, a predicate and an object. Each predicate represents a statement of a relationship between the things denoted by the subjects and objects that it links. Each portion of a triple has a universal resource indicator (URI) associated with it. Thus, a URI may be generated at 435 based on the context model. One or more triples may then be created which encode the relationship between this data item and other data in the automation system environment. Alternatively, in other embodiments, the processing at 435 is performed by linking an identifier of the sensor generating the incoming data to the corresponding concept (e.g., class) in the ontology which is then resolved by the query processor (see step 440 below). At 440, the semantically contextualized data is stored. In some embodiments, this storage is performed in a historian (e.g., with annotation via mapping of IDs), while, in other embodiments, data may be stored in a database constructed specially for the storage and retrieval of triples (i.e., a triplestore) with direct annotation of data.

Continuing with reference to FIG. 4, at step 415, an out-cycle analytics component (see FIG. 2) retrieves data from storage and generates new events. Since step 415 is performed out-cycle, the out-cycle analytics component is able to continuously monitor and analyze the data in a longer period of time in order to generate new events Once an enhanced event is generated and detected, context information required for the enhanced event (as defined in the context model) is collected from the storage at step 420. New enhanced events with the contexts are stored in an event database. At step 425, events and data in the storage are made available via a semantic query processor. This processor may execute a query formulated against the semantic context model (e.g., SPARQL query) and retrieve the relevant data. In some embodiments, data is directly stored as semantic data (e.g. as RDF in a triplestore) and the query may be natively executed. In other embodiments, the data is stored in a plain historian and the query is translated (SPARQL→Historian queries) based on the context models.

Note that FIG. 4 illustrates two distinct processing paths: contextualization of data occurs at steps 430-440, while in-cycle event processing is performed at 410. These two processing paths may be executed in parallel or sequentially. In some embodiments, the Intelligent PLC is configured to allow processing based on the available resources on the Intelligent PLC. For example, for a multi-processor controller, one processor may be dedicated to contextualization, while another processor handles event processing. Conversely, for a single-processor environment, the two processing paths may be executed sequentially.

Figure 5:
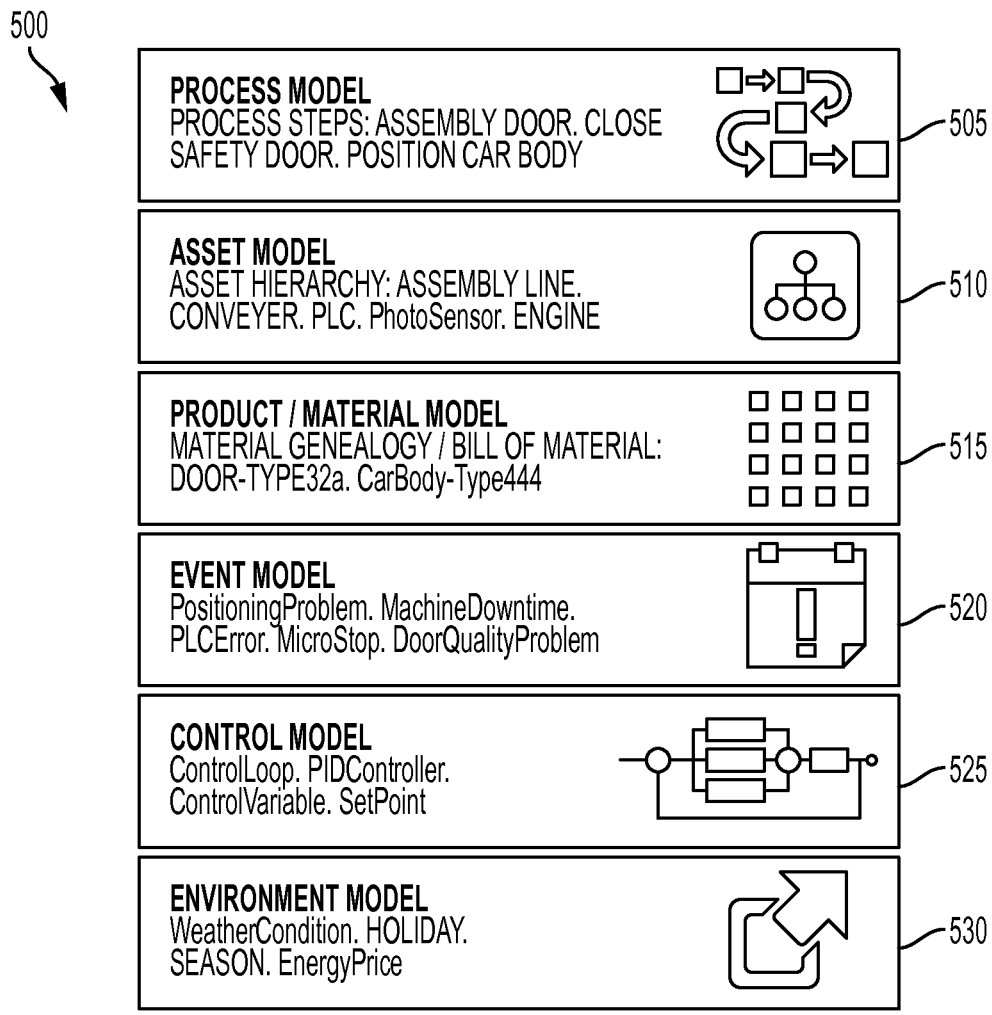
FIG. 5 illustrates an example set of context models 500 that may be used by an Intelligent PLC in some embodiments.

FIG. 5 illustrates an example set of context models 500 that may be used by an Intelligent PLC in some embodiments. The Process Model 505, the Asset Model 510, the Material Model 515, the Event Model 520, the Control Model 525, and the Environment Model 530 shown in FIG. 5 are the five main models that constitute the contextualization framework of an Intelligent PLC. In contrast to all other context models 505, 510, 515, 525, and 530 which contain static data, enhanced events in the Event Model 520 are dynamically generated during runtime of the PLC. Therefore, enhanced events may be used to associate/annotate static context information (e.g. product types, plant topology, process information) to time series data. For example, an enhanced event can be used to document that a product Y was produced by machine X in time window Z. Without this enhanced event, it is very hard to reconstruct these dependencies only based on the time stamps.

Figure 6A:
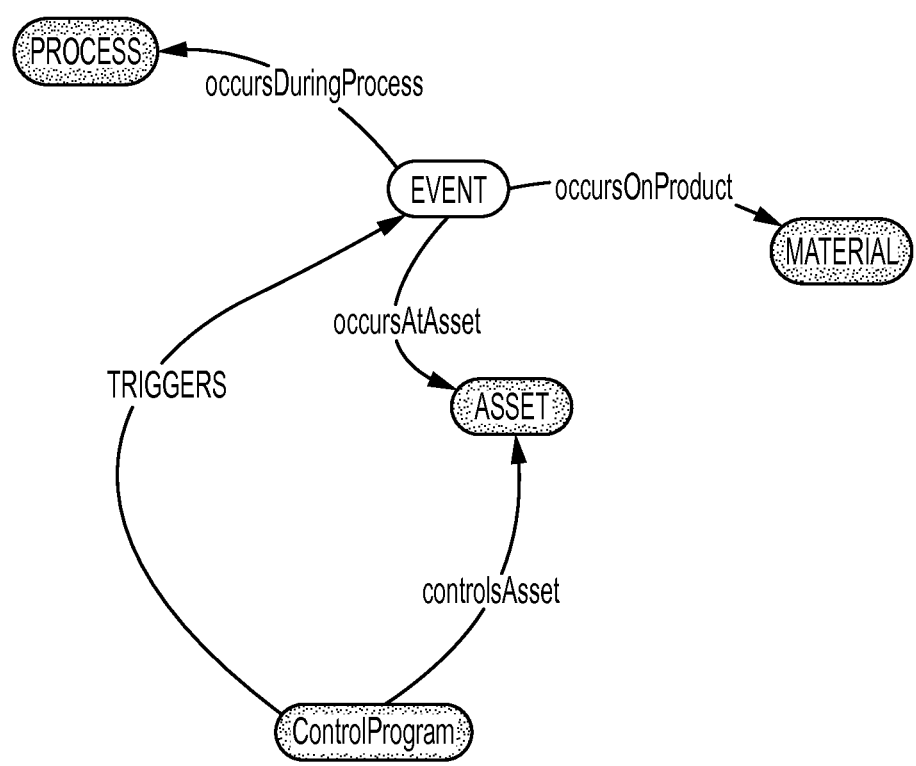
FIG. 6A provides a high-level overview of the models that may be applied in some embodiments.
Figure 6B:
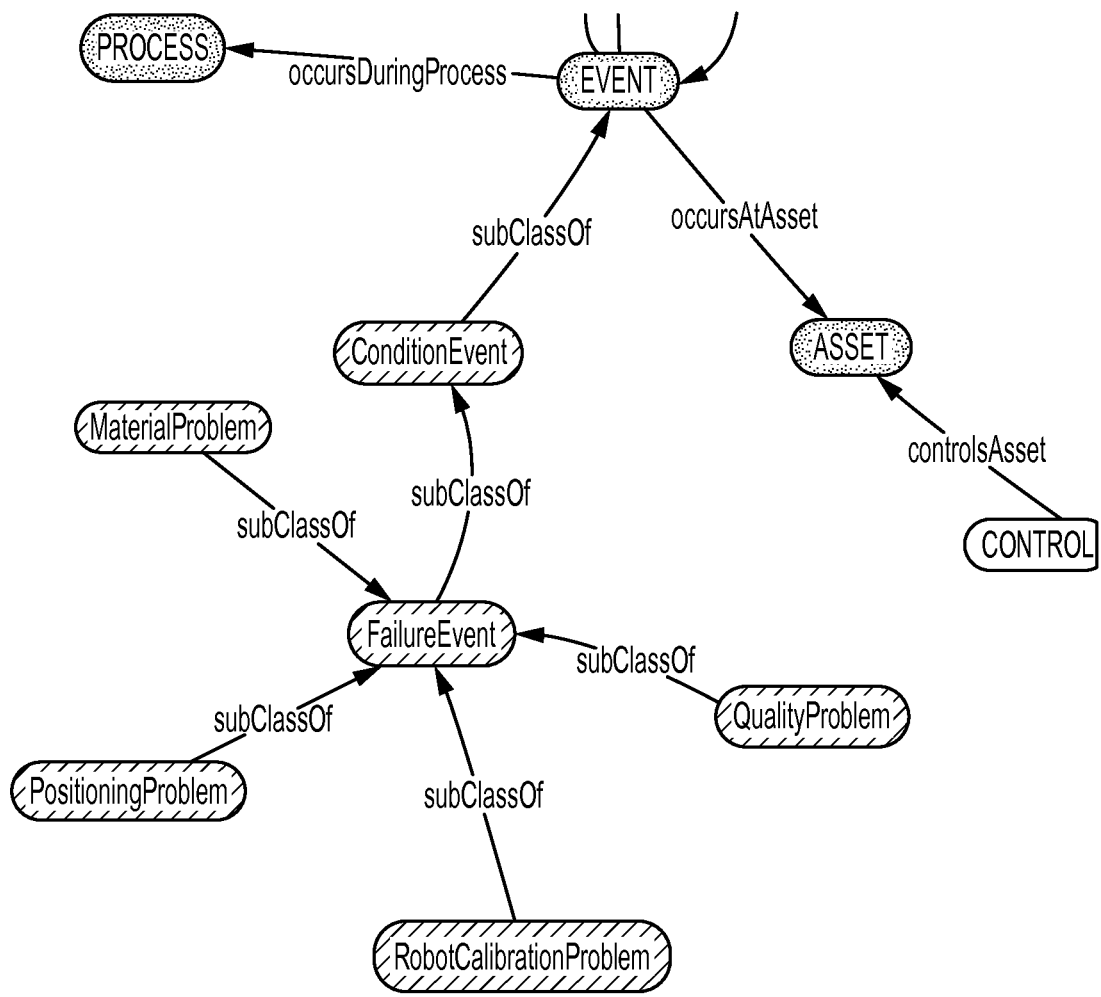
FIG. 6B shows the expansion of the top-level event model shown in FIG. 6A.
Figure 6C:
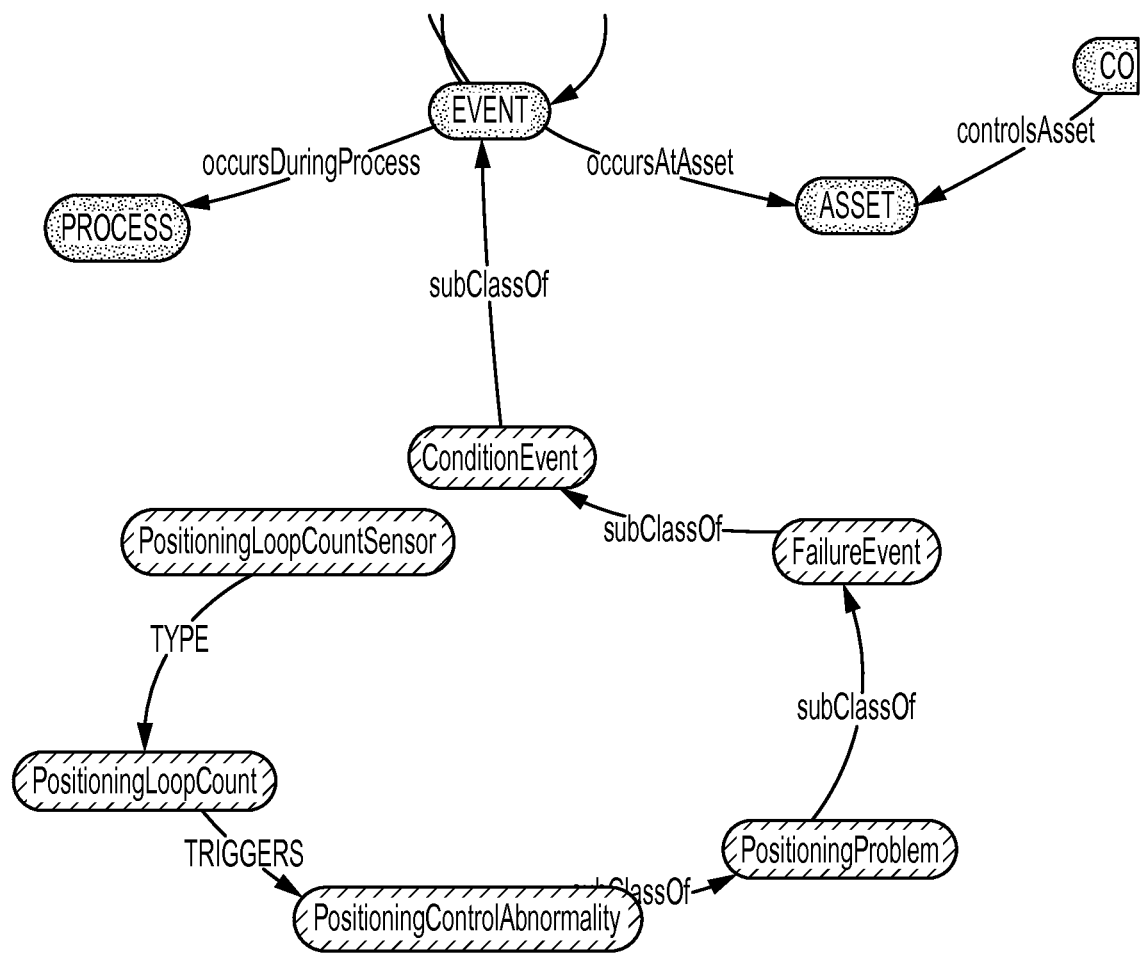
FIG. 6C shows an event model linked to control and asset models.

FIGS. 6A-6C provide a graphical representation of how the models shown in FIG. 5 may be applied in handling automotive door assembly process, according to some embodiments. In some embodiments an engineering tool may generate graphics similar to those presented in these figures in order to allow an engineer to fully understand the context of enhanced events generated by the system.

FIG. 6A provides a high-level overview of the models. An event (e.g. a positioning error) occurs on an asset (e.g. skid barcode sensor), during a process (door assembly) and on a product (door). A control program can trigger an event (e.g. a control variable exceeding a threshold).

FIG. 6B shows the expansion of the top-level event model shown in FIG. 6A. This example shows that a failure event can have different types: a position problem, a material problem or a robot calibration problem. This information can be predefined based on the domain knowledge or learnt in the runtime.

FIG. 6C shows an event model linked to control and asset models. In this example, the position problem is further expanded, one can see that a position loop count sensor (soft-sensor) can trigger a position control abnormality. The position loop count soft-sensor belongs to the control model and it is not available for traditional PLCs outside the control program.

As noted above with reference to FIG. 2, enhanced events are generated in the analytics components in an Intelligent PLC. In some embodiments, the analytics components utilize a rules engine to perform this generation. The rules engine evaluates the incoming data against some predefined rules at every control cycle. If all its conditions are satisfied, an event will be fired. The rules can be deployed to the PLC at any time. Thus, rules can be added, modified and removed offline/online and deployed at runtime onto a running Intelligent PLC. The rules are evaluated and the new events are generated at the next cycle. There is no need to reconfigure and re-engineer the entire automation system. Moreover, in some embodiments, the specifications of how events are generated (e.g. a threshold) is learned over time based on the historic data and events. These events are not based on fixed thresholds but rather dynamic values learned from historical conditions.

Figure 7D:
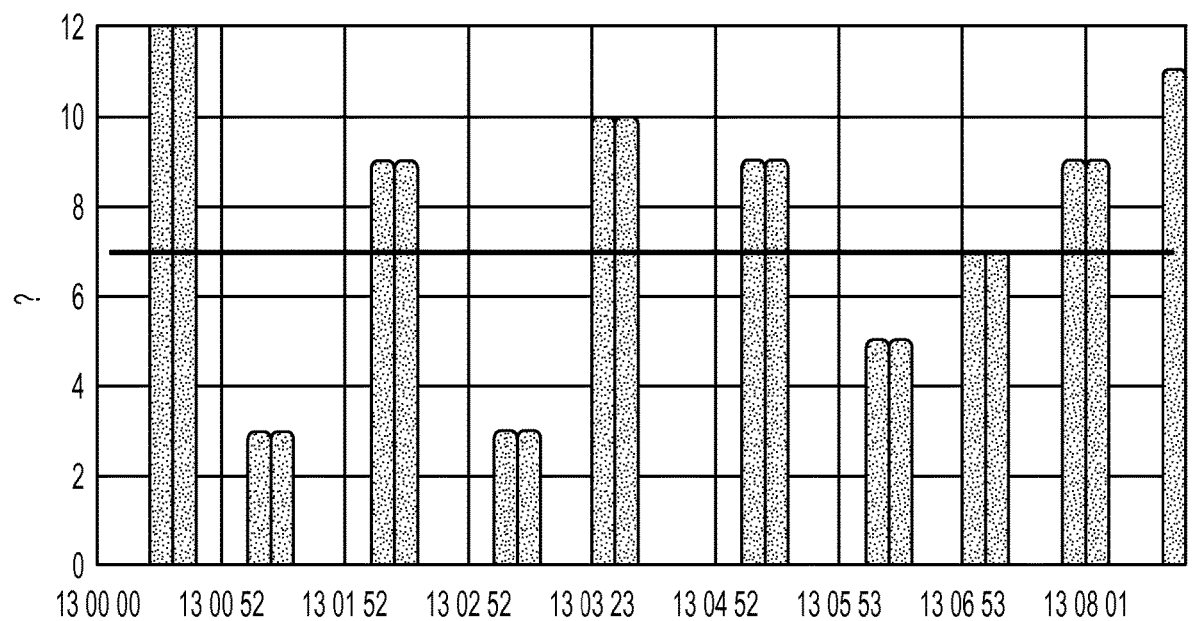
FIG. 7D shows an example of how an in-cycle analytics component triggers an event.

FIGS. 7A, 7B, 7C, and 7D illustrate how the rules engine concept can be applied to particular example: an automotive door assembly process. FIG. 7A shows a rule to generate a door quality problem event if the value of the DoorQualitySensor is above zero. FIG. 7B shows a rule to generate a positioning control abnormality event if the value of the PositionLoopCounterSensor is above 5. In this case, the positionLoopCountsensor is a control variable, part of control Model. FIG. 7C shows a rule that links the door quality event and the position control abnormality event. A cause-by attribute is set in the door quality problem event if both events occur on the same door. FIG. 7D shows an example of how the in-cycle analytics component (e.g. a rule engine) triggers an event. The loop count soft-sensor for a set of doors is evaluated in the rule engine. The threshold (line 701) is learned from historical data using machine learning techniques. An engineer can use this learned threshold to trigger an event, if the value is above it. This is not possible with traditional PLCs, which have to use a predefined quantity or variable for using it as a threshold.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, control layer devices and related computing infrastructure, which may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of generating events based on automation system data in an intelligent programmable logic controller, the method comprising:
    applying, by the intelligent programmable logic controller, a context model to the automation system data to create contextualized data;
    generating, by the intelligent programmable logic controller during an out-cycle event generation process that defines a first time period that is longer than a second time period defined by each of a plurality of control cycles executed by the intelligent programmable logic controller, one or more enhanced events based on the contextualized data; and
    during each control cycle included in the plurality of control cycles executed by the intelligent programmable logic controller, performing an in-cycle event generation process by the intelligent programmable logic controller, the in-cycle event generation process defining the second time period that is shorter than the first time period, the in-cycle event generation process comprising:
        collecting automation system data;
        retrieving, by the intelligent programmable logic controller, historical automation system data from a non-volatile computer-readable storage medium operably coupled to the intelligent programmable logic controller;
        modifying, by the intelligent programmable logic controller, one or more analytics specifications used by analytics components based on the historical automation data; and
        using the modified analytics specifications to create one or more additional events.

2. The method of claim 1, wherein the one or more additional events are further based on the historical automation system data.

3. The method of claim 1, further comprising:
    storing, by the intelligent programmable logic controller, the one or more events in an event database included within the intelligent programmable logic controller.

4. The method of claim 3, further comprising:
    receiving, by the intelligent programmable logic controller, an event request;
    formulating, by the intelligent programmable logic controller, a query based on the event request and the context model;
    retrieving, by the intelligent programmable logic controller, response data from the event database based on the query.

5. The method of claim 1, wherein the in-cycle event generation process further comprises:
    using analytics components to determine whether an event generation condition exists based on the automation system data, and
    generating one or more additional events if the event generation condition exists.

6. The method of claim 5, further comprising:
    receiving one or more new analytics specifications; and
    updating the analytics components based on the one or more new analytics specifications during runtime of the intelligent programmable logic controller.

7. An intelligent programmable logic controller comprising:
    a processor configured to execute according to a plurality of control cycles;
    a volatile computer-readable storage medium comprising a process image area;
    a non-volatile computer-readable storage medium; and
    a plurality of controller components executed by the processor, the plurality of controller components comprising:
        a data transfer component configured to update the process image area during each control cycle with contents comprising automation system data;
        a contextualization component configured to apply a context model to the automation system data to create contextualized data;

an out-cycle analytics component configured to, during a first time period that is longer than a second time period defined by each of the plurality of control cycles, generate one or more enhanced events based on the contextualized data, and an in-cycle analytics component configured to perform an in-cycle generation process during each control cycle in the plurality of control cycles, the in-cycle generation process defining the second time period that is shorter than the first time period, the in-cycle generation process comprising:

receiving one or more new analytics specifications;

updating analytics components based on the one or more new analytics specifications during runtime of the intelligent programmable logic controller;

modifying one or more analytics specifications used by the analytics components based on historical automation data; and using the modified analytics specifications to create additional events; and a historian component comprising an event database configured to store the one or more enhanced events on the non-volatile computer-readable storage medium.

8. The intelligent programmable logic controller of claim 7, wherein the contextualization component is further configured to:

retrieve the historical automation system data from the historian component.

9. The intelligent programmable logic controller of claim 8, wherein the contextualization component is further configured to perform an in-cycle event generation process during each control cycle, the in-cycle event generation process comprising:

using analytics components to determine whether an event generation condition exists based on the automation system data, and generating one or more additional events if the event generation condition exists.

10. The intelligent programmable logic controller of claim 7, wherein the contextualization component is further configured to receive an event request;

formulate a query based on the event request and the context model; and retrieve response data from the event database based on the query.

\* \* \* \* \*